(12) United States Patent
Rimmer et al.

(10) Patent No.: US 7,687,148 B2
(45) Date of Patent: Mar. 30, 2010

(54) COATED GLASS

(75) Inventors: David Rimmer, St. Helens (GB); Kevin David Sanderson, Wigan (GB); Thomas Paul, Herne (DE)

(73) Assignee: Pilkington Group Limited, St. Helens (GB)

( * ) Notice: Subject to any disclaimer, the term of this patent is extended or adjusted under 35 U.S.C. 154(b) by 547 days.

(21) Appl. No.: 10/558,596

(22) PCT Filed: Jun. 3, 2004

(86) PCT No.: PCT/GB2004/002371

§ 371 (c)(1),
(2), (4) Date: Dec. 4, 2006

(87) PCT Pub. No.: WO2004/108619

PCT Pub. Date: Dec. 16, 2004

(65) Prior Publication Data

US 2007/0111012 A1    May 17, 2007

(30) Foreign Application Priority Data

Jun. 6, 2003    (GB) .................................. 0313029.1

(51) Int. Cl.
*B32B 17/06*    (2006.01)
(52) U.S. Cl. ........................ 428/432; 428/701; 428/702
(58) Field of Classification Search .................... None
See application file for complete search history.

(56) References Cited

U.S. PATENT DOCUMENTS

2003/0039843 A1*    2/2003    Johnson et al. ............. 428/432

* cited by examiner

*Primary Examiner*—Ling Xu
(74) *Attorney, Agent, or Firm*—Marshall & Melhorn, LLC

(57) ABSTRACT

Dual coated glass sheets comprise a photocatalytically active self cleaning coating on one surface and heat reflecting coating on the second surface selected so that its single surface reflectivity is either at least three times or less than one third that of the self cleaning coating. The selection of the heat reflecting coating provides a sheet having an improved appearance. Such dual coated sheets combine self cleaning properties with solar control or low emissivity properties and are useful as building glasses.

16 Claims, No Drawings

COATED GLASS

BACKGROUND OF THE INVENTION

This invention relates to dual coated self cleaning glazing sheets and to laminates and multiple glazing units having coatings on at least two surfaces thereof at least one of which is a self cleaning coating.

Self cleaning glazing sheets having a coating which is hydrophilic and photocatalytically active have become articles of commerce in recent years. The coatings generally comprise a metal oxide such as titanium oxide, iron oxides, silver oxides, copper oxides, tungsten oxides, zinc oxides and zinc/tin oxides. The oxide which is most commonly used is titanium dioxide. Self cleaning glazing sheets having a titanium dioxide coating on one surface thereof are disclosed in EP 901991, WO 97/07069, WO 97/10186, WO 98/06675 and WO 98/41480.

Other functional coatings which impart different properties to the coated glass sheet are also known. Thin coatings comprising transparent metal and metal oxide layers singly or in multiple layers are used to regulate the transmission of radiation through the glass. Low-E coatings allow solar energy transmission through the glass but reflect longer wavelength radiation and thereby conserve heat within a building. Solar control coatings reflect or absorb solar energy and thereby reduce the amount of heat entering a building or vehicle. These coatings are normally applied to one surface of a glass sheet. When the coated glass is incorporated into a laminated window or a multiple glazing unit the coated surface is normally positioned on an interior surface so as to avoid damage to the coating.

In contrast the coated surface of a self cleaning glazing sheet must be positioned on an exterior face of a glazing. The active coating may face the interior of a building or a vehicle. However more commonly the active coating faces the outside of the building or vehicle where it may be washed by rain water.

The application of a functional coating to the reverse side of a glass sheet having a self cleaning coating upon its front surface presents an opportunity to produce dual coated glasses having a coating on both sides of the glass sheet which might exhibit an advantageous combination of properties. The production of such a dual coated glass sheet poses a number of problems. Firstly the glass sheets to be coated are normally produced using the float glass process. Production of a dual coated sheet requires the deposition of a coating upon the lower or tin side of the glass as well as on its upper or air side. Secondly the coatings need to be applied with care to ensure that the entire surface of the sheet is coated whilst not contaminating the opposite face and thirdly the dual coated sheet must have acceptable properties including optical properties. The application of a functional coating such as a heat reflecting coating to the reverse side of a glass sheet having a self cleaning coating on its front side can cause the dual coated product to have an unacceptable coloration.

BRIEF SUMMARY OF THE INVENTION

We have now discovered that the appearance of a dual coated glass sheet having a self cleaning coating on one side thereof and a functional coating on the reverse side is improved if the single surface reflectivity of the heat reflective coating (measured on the coated side) is either at least three times or less than one third that of the self cleaning coating (measured on the coated side and excluding the reflection from the other side of the glass). Accordingly from one aspect this invention provides a dual coated self cleaning glass sheet which comprises on a first surface thereof a photocatalytically active self cleaning coating and on the second surface thereof a functional coating said functional coating having a single surface reflectivity (measured on the coated side) of less than one third or at least three times that of the photocatalytically active hydrophilic coating.

DETAILED DESCRIPTION OF THE INVENTION

The functional coating on the reverse side of the sheet is preferably a heat reflective coating which is a coating which has an increased reflection for the near and far infra red radiation. In a first preferred embodiment the functional coating is a Low E coating and in a second preferred embodiment the functional coating is a solar control coating.

The photocatalytic coating preferably comprises titanium dioxide. The titanium dioxide is preferably crystalline. All of the three crystalline forms of titania; anatase, rutile and brookite are useful but preferably the titanium dioxide is predominantly in the form of anatase titania.

The photocatalytic coating should be thick enough to provide the desired degree of activity. Increasing the thickness of the coating tends to increase its reflectivity. Typically the photocatalytic coating will be from 10 to 20 nm thick. The reflectivity of the coated glass (measured from the coated side and in the absence of a coating on the other surface of the glass) is preferably less than 20%, more preferably less than 15% and most preferably less than 10%. In this specification all values for reflection and transmission are calculated using the EN 410 standard.

The photocatalytically active coating may be deposited using a variety of techniques such as chemical vapour deposition (CVD) processes, spray pyrolysis processes, magnetron sputtering processes and sol gel processes. An advantage of CVD processes is that they may be employed during the float glass production process. A vapour containing a suitable precursor may be brought into contact with the glass at an elevated temperature typically in the range 400° C. to 720° C. In the preferred embodiments suitable precursors useful in the deposition of a titania coating include titanium tetrachloride, titanium tetraisopropoxide and titanium tetraethoxide. Such processes have been described in WO 98/06675, WO 98/41480 and WO 00/75087.

It is also known that titania coatings which are deposited on the surface of a soda-lime glass sheet may exhibit reduced levels of photocatalytic activity and hydrophilicity because of migration of sodium ions from the glass into the titania layer. WO 98/06675, WO 98/41480 and WO 00/75087 all disclose the use of a sodium ion blocking layer between the glass and the titania layer. The use of such a blocking layer is a preferred aspect of the glazing sheets of this invention. Preferred blocking layers are formed from metal oxides or more preferably from a silicon oxide. The most preferred blocking layers are those formed using the processes described in GB 2199848 commonly referred to as silicon oxycarbide or silicon oxynitride. The alkali metal blocking layer is preferably less than 60 nm thick and more preferably less than 40 nm thick so as to minimise any impact upon the optical properties of the coated glass sheet. The reflectivity of glazing sheets according to this invention which have a self cleaning coating comprising a barrier layer between the glass and the photocatalytic layer is the reflection at normal incidence of the coated side of this glass.

These photocatalytically active hydrophilic coatings are preferably applied using CVD deposition carried out as part of a float glass production process. The coated glass is taken from the production line. Float glass is produced in a variety of thicknesses typically from 2 to 20 mm and the coating may be applied to any of these. Normally for building glass the glass will be from 4 to 12 mm thick.

The coated glass is removed from the float glass production line in the normal way. The functional coating on the reverse side of the glass sheet may be applied in a separate coating step. This second coating step should be carried out in such a manner as to avoid any contamination of the self cleaning coating by the functional coating. In general the preferred methods for depositing a heat reflective coating are pyrolytic coating and magnetron sputtering. The preferred method is magnetron sputtering.

Functional coatings which are heat reflecting coatings are also well known in the art. Solar control glasses having a reflective coating on one surface thereof are established articles of commerce examples being those glasses sold under the trade mark Suncool by the Pilkington group of companies. Such coatings may comprise at least one reflective metal layer which is sandwiched between two layers of a dielectric material. Coatings comprising one or two metal layers are most commonly used. The reflective metal layer is commonly silver or silver alloy layer which is from 5 to 20 nm thick. The dielectric material is commonly a metal oxide such as zinc oxide. The dielectric layer may be from 10 to 80 nm thick. A sacrificial layer of a metal such as titanium or a metal suboxide may be deposited on top of the silver layer or layers. During the subsequent deposition of the dielectric metal oxide the sacrificial layer serves to protect the silver layer form oxidation and is itself oxidised. The selectivity of these coatings (the ratio of the light transmission to energy transmission) may vary being normally at least 1.5 and preferably at least 1.7. The coatings useful in this invention preferably have a reflectivity which is less than 5% and more preferably less than 3% or a reflectivity which is greater than 30%.

The dual coated glazing sheets of this invention may be incorporated into a multiple glazing unit or into a laminated glass sheet. In both uses the surface having the photocatalytically active coating should form an exterior surface of the multiple glazing unit or laminated sheet. Multiple glazing units and laminated glass sheets which incorporate a dual coated glazing sheet as hereinbefore described provide a further aspect of this invention The invention also provides multiple glazing units and laminated glass sheets comprising at least two glass panes wherein one pane has a photocatalytically active coating on one surface and a second pane which has a functional coating which is preferably a heat reflecting coating on one surface thereof which are characterised in that the coated surfaces form the exterior surfaces of the multiple glazing unit or the laminated glass sheet and that the functional coating has a single surface reflectivity which is less than one third or more than three times that of the photocatalytic coating.

The invention is illustrated by the following examples:

EXAMPLE 1

A 6 mm thick glass substrate dimensions 50×70 cm$^2$ was used. The glasses were coated online with a photocatalytic titania coating on top of a silica underlayer on the air side of the glass using a CVD deposition process of the type described in WO 98/06675. This coating had a single reflection of 9.4% and the colour co-ordinates were a*=−0.9 and b*=−11.1 (these co ordinates were determined using DIN 6174 for the 10° observer).

A second coating was deposited on the tin side in a vacuum coater. The first layer was a titanium dioxide coating. Therefore three medium-frequency double cathodes were used with a power of 60 kW. The gas mixture in the chamber was Ar/N$_2$/O$_2$ with a ratio 4:2:3 at a pressure of 3.3×10$^{-3}$ mbar. The thickness of the titanium dioxide layer was 28 nm. Onto the titanium oxide layer a 6 nm thick zinc oxide layer was coated. For this purpose an Ar/N$_2$/O$_2$ gas mixture was introduced in the chamber with a ratio 4:2:4 at a pressure of 2.2×10$^{-3}$ mbar. Medium-frequency double cathodes were used with a power Of 10 kW. Next an 8 nm thick silver layer was applied. The atmosphere was pure Ar at a pressure of 1.5×10$^{-3}$ mbar and the power of the DC-cathodes was 2.1 kW. Onto the silver layer a 3.4 nm NiCr (80/20) was applied. Again the atmosphere was pure Ar at a pressure of 1.5×10$^{-3}$ mbar and the power of the DC-cathodes was 8.2 kW. Finally a tin oxide layer was coated in an Ar/N$_2$/O$_2$—mixture with a ratio 3:2:9. Two DC-cathodes were used with a power of 13 kW, this gave a layer thickness of 30 nm.

The single surface reflectivity of this vacuum coating was 2.4%, this gave a factor 3.9 lower reflection compared to the single reflection of the photocatalytic coating. The colour co-ordinates of the heat reflecting coating alone measured from the coated side were a*=−2.5 and b*=−1.1. The total reflectivity of both coatings (measured from the surface having the photocatalytic titania coating) was 11% and the colour co-ordinates of the dual coated glass sheet were a*=−0.0 and b*=−9.8.

EXAMPLE 2

Onto the same float glass sheet having a photocatalytic titania coating on the air side of the glass as in Example 1 a titanium dioxide layer was applied on the tin side of the glass.

The atmosphere was the same as was used in the deposition of the titanium oxide in Example 1. The power was only 40 kW for the three medium-frequency double cathodes, this gave a thickness of 14 nm of the titanium dioxide. As in Example 1 a 6 nm thick zinc oxide layer was applied with the same sputter parameters. Onto the zinc oxide a silver layer was coated with a thickness of 20 nm. The atmosphere was pure Ar at a pressure of 1.5×10$^{-3}$ mbar and the power of the DC-cathodes was 6.2 kW. Next a 0.5 nm thick NiCr (80/20) layer was applied with the same sputter atmosphere as the NiCr (80/20) layer in Example 1 and the power of the DC cathodes was 1.8 kW. Onto the NiCr layer a 53 nm thick tin oxide layer was coated with a power of 24 kW. The gas mixturewas Ar/N$_2$/O$_2$ with a ratio 3:2:11 at a pressure of 3.5 33 10$^{-3}$ mbar. Finally a 2 nm titanium dioxide layer was coated with a medium-frequency double cathode and a power of 60 kW. The gas mixture was Ar/N$_2$/O$_2$ with a ratio 3:2:5 at a pressure of 2.8 10$^{-3}$ mbar.

The single surface reflectivity of the heat reflective coating was 32%. This gave a factor of 3.4 higher reflection than the photocatalytic layer. The colour co-ordinates of the heat reflecting coating alone measured from the coated side were a*=−2.0 and b*=−1.2. The total reflectivity of both coatings (measured from the surface having the photocatalytic titania coating) was 36% and the colour co-ordinates of the dual coated glass sheet were a*=−1.7 and b*=−3.4.

EXAMPLE 3

Onto the same float glass sheet having a photocatalytic titania coating on the air side of the glass as in Example 1 a titanium dioxide layer was applied on the tin side of the glass.

The atmosphere was the same as used in the deposition of the titanium dioxide in Example 1. The power was only 50 kW for the three medium-frequency double cathodes, this gave a thickness of 20 nm. Onto the titanium oxide layer a 6 nm thick zinc oxide layer was applied with the same sputter parameter as in Example 1. Next an 8 nm thick silver layer was coated with a DC power of 2.1 kW in a pure Ar atmosphere at a pressure of $3.3 \times 10^{-3}$ mbar. Onto the silver layer an indium-tin-oxide layer was applied from a ceramic target with a DC-power of 3 kW in a pure Ar atmosphere at a pressure of $2.3 \times 10^{-3}$ mbar. Next a 60 nm thick tin oxide layer was coated. The power of the two DC cathodes was 15 kW in an $Ar/N_2/O_2$ mixture with a ratio 1:1:6 at a pressure of $3.6 \times 10^{-3}$ mbar. Onto the tin oxide layer a 25 nm thick zinc oxide layer was applied with a medium-frequency double cathode and a power of 18 kW. A gas mixture $Ar/N_2/O_2$ was used with a ratio 1:1:6 at a pressure of $3.6*10^{-3}$ mbar. Next a 13 nm thick silver layer was coated with a DC-power of 3.1 kW. The atmosphere was pure Ar at a pressure of $3.3 \times 10^{-3}$ mbar. Again a 3 nm indium-tin-oxide layer was coated with the same parameters as onto the first silver layer. Finally a 36 nm tin oxide layer was applied with two DC-cathodes at a power of 15 kW. A gas mixture $Ar/N_2/O_2$ was used with a ratio 3:2.6 at a pressure of $2.6 \times 10^{-3}$ mbar.

The single surface reflectivity of the heat reflecting coating was 1.9%. This gave a factor 4.9 lower reflection than the photocatalytic layer. The colour co-ordinates of the heat reflecting coating alone measured from the coated side were $a*=1.4$ and $b*=-7.9$. The total reflectivity of both coatings (measured from the surface of the glass having the photocatalytic coating) was 11% and the colour co-ordinates of the dual coated glass sheet were $a*=-0.5$ and $b*=-11.6$.

COMPARATIVE EXAMPLE 4

Onto the same float glass sheet having a photocatalytic titania coating on the air side of the glass as in Example 1 a titanium dioxide layer was applied on the tin side of the glass.

The atmosphere was the same as used in the deposition of the titanium dioxide in Example 1. The power was only 65 kW for the three medium-frequency double cathodes, this gave a thickness of 24 nm of the titanium oxide. As in Example 1 a 6 nm thick zinc oxide layer was applied with the same sputter parameters. Onto the zinc oxide a silver layer was coated with a thickness of 15 nm. The atmosphere was pure Ar at a pressure of $1.5 \times 10^{-3}$ mbar and the power of the DC cathodes was 5.2 kW. Next a 0.5 nm thick NiCr (80/20) layer was applied with the same sputter atmosphere as the NiCr (80/20) in Example 1 and the power of the DC cathodes was 1.8 kW. Finally onto the NiCr layer a 51 nm thick tin oxide layer was coated with a power of 23 kW. The gas mixture was $Ar/N_2/O_2$ with a ratio 3:2:11 at a pressure of $3.2 \times 10^{-3}$ mbar.

The single surface reflectivity of the heat reflecting coating was 12.7%. This gave a factor of 1.4 higher reflection than the photocatalytic layer. The colour co-ordinates of the heat reflecting coating alone measured from the coated side were $a*=-0.05$ and $b*-11.7$. The total reflectivity of both coatings (measured from the surface of the glass having the photocatalytic coating) was 20% and the colour co-ordinates of the dual coated glass were $a*=-0.8$ and $b*=-12.1$.

The coated glass panes produced in this example showed significantly higher colour variations along the glass surface in comparison to those produced in Examples 1 to 3 above which are examples of the present invention.

The invention claimed is:

1. A dual coated self cleaning glazing sheet which comprises on a first surface thereof a photocatalytically active hydrophilic coating with a single surface reflectivity of less than 20% and on the second surface thereof a functional coating having a single surface reflectivity of of less than 5% or greater than 30%, wherein the composition and properties of each of said coatings is chosen such that said functional coating has a single surface reflectivity of less than one third or more than three times that of the photocatalytically active hydrophilic coating.

2. A dual coated glazing sheet according to claim 1, wherein the functional coating is a heat reflecting coating.

3. A glazing sheet according to claim 1, wherein the photocatalytically active hydrophilic coating has a single surface reflectivity of less than 15%.

4. A glazing sheet according to claim 3, wherein the photocatalytically active hydrophilic coating has a single surface reflectivity of less than 10%.

5. A glazing sheet according to claim 1, wherein the photocatalytically active hydrophilic coating comprises titanium dioxide.

6. A glazing sheet according to claim 5, wherein the titanium dioxide coating is from 10 to 20 nm thick.

7. The glazing sheet according to claim 1, wherein the photocatalytically active hydrophilic coating comprises an underlayer which is an alkali metal ion blocking layer.

8. The glazing sheet according to claim 7, wherein the underlayer comprises a silicon oxide.

9. The glazing sheet according to either of claim 7, wherein the underlayer is from 25 to 40 nm thick.

10. The glazing sheet according to claim 1, wherein the functional coating has a single surface reflectivity of less than 5%.

11. The glazing sheet according to claim 10, wherein the functional coating has a single surface reflectivity of less than 3%.

12. The glazing sheet according to claim 1, wherein the single surface reflectivity of the functional coating is greater than 30%.

13. A glass laminate comprising at least two glass panes separated by a bonding interlayer disposed between them wherein one of the glass panes comprises a dual coated sheet according to claim 1.

14. A multiple glazing unit comprising at least two glass panes spaced apart by a perimeter seal wherein at least one of the glass panes comprises a dual coated glass according to claim 1.

15. A glass laminate comprising at least two glass panes separated by a bonding interlayer wherein a first of said at least two panes has a photocatalytically active hydrophilic coating on an exterior surface thereof with a single surface reflectivity of less than 20% and a second of said at least two glass panes has a functional coating upon at least one surface thereof having a single surface reflectivity of of less than 5% or greater than 30%, wherein the composition and properties of each of said coatings is chosen such that the functional coating has a single surface reflectivity which is less than one third or more than three times that of the photocatalytically active coating of the first pane.

16. A multiple glazing unit comprising at least two glass panes spaced apart by a perimeter seal wherein a first of the panes has a photocatalytically active hydrophilic coating on an exterior surface thereof with a single surface reflectivity of less than 20% and a second of the at least two glass panes has a functional coating upon at least one surface having a single surface reflectivity of of less than 5% or greater than 30%, wherein the composition and properties of each of said coatings is chosen such that the functional coating has a single surface reflectivity which is less than one third or more than three times that of the photocatalytic coating of the first glass pane.

* * * * *